US011208211B2

(12) United States Patent
Yilmaz et al.

(10) Patent No.: US 11,208,211 B2
(45) Date of Patent: Dec. 28, 2021

(54) REPLACEABLE CONNECTION MODULES FOR HIGH USE ELECTRONIC DEVICE RECEPTACLES

(71) Applicant: Burrana IP and Assets, LLC, Springville, UT (US)

(72) Inventors: Arda Yilmaz, Brisbane (AU); Joshua Kelly, Brisbane (AU); Stuart Ketchion, Brisbane (AU)

(73) Assignee: Burrana IP and Assets, LLC, Springville, UT (US)

( * ) Notice: Subject to any disclaimer, the term of this patent is extended or adjusted under 35 U.S.C. 154(b) by 69 days.

(21) Appl. No.: 16/396,028

(22) Filed: Apr. 26, 2019

(65) Prior Publication Data

US 2020/0339265 A1  Oct. 29, 2020

(51) Int. Cl.
*B64D 11/06* (2006.01)
*H01R 25/00* (2006.01)
*H01R 24/76* (2011.01)
*H02J 7/00* (2006.01)

(52) U.S. Cl.
CPC ......... *B64D 11/0624* (2014.12); *H01R 24/76* (2013.01); *H01R 25/006* (2013.01); *H02J 7/007* (2013.01); *H02J 7/0045* (2013.01); *B64D 2221/00* (2013.01); *H01R 2201/26* (2013.01); *H02J 7/00* (2013.01)

(58) Field of Classification Search
CPC .. B64D 11/0624; H01R 24/76; H01R 25/006; H02J 7/007
See application file for complete search history.

(56) References Cited

U.S. PATENT DOCUMENTS

| | | | |
|---|---|---|---|
| 6,038,426 A | 3/2000 | Williams | |
| 6,726,509 B2 | 4/2004 | Milan | |
| 7,438,602 B2 | 10/2008 | Montgomery | |
| 7,487,938 B2 | 2/2009 | Brady | |
| 7,899,970 B2 | 3/2011 | Mori | |
| 8,033,867 B1 | 10/2011 | Kessler | |
| 8,464,982 B2 | 6/2013 | Raybell | |
| 8,903,601 B2 | 12/2014 | Muirhead | |
| 8,929,082 B2* | 1/2015 | Mondragon | B60N 2/879 361/728 |
| 9,016,627 B2* | 4/2015 | Margis | B64D 11/00151 244/118.6 |
| 9,496,666 B2 | 11/2016 | Abbinante | |
| 9,806,772 B2 | 10/2017 | Tang | |
| 9,819,204 B2 | 11/2017 | Miller | |
| 2011/0003505 A1 | 1/2011 | Greig | |
| 2015/0106536 A1 | 4/2015 | Lauby | |
| 2015/0288205 A1* | 10/2015 | Weinstein | H02J 7/0027 320/107 |
| 2015/0341677 A1 | 11/2015 | Petrisor | |

(Continued)

*Primary Examiner* — Abdullah A Riyami
*Assistant Examiner* — Nader J Alhawamdeh
(74) *Attorney, Agent, or Firm* — Fabian VanCott; Steven L. Nichols

(57) ABSTRACT

The present specification describes a replaceable connection module. The replaceable connection module includes a port to receive signals and power from a controller and at least one receptacle to provide received signals and power to a connected electronic device. The module also includes a plurality of conductors connecting the port with at least one receptacle. Control of the signals and power at the at least one receptacle is performed by the controller.

20 Claims, 10 Drawing Sheets

(56) References Cited

U.S. PATENT DOCUMENTS

| | | |
|---|---|---|
| 2016/0072238 A1 | 3/2016 | Rengert |
| 2016/0096626 A1 | 4/2016 | Hoch |
| 2016/0134138 A1 | 5/2016 | Jouper |
| 2016/0306417 A1 | 10/2016 | Greig |
| 2016/0370835 A1* | 12/2016 | Erickson ............... G06F 13/385 |
| 2017/0025803 A1 | 1/2017 | Abbinante |
| 2017/0331307 A1 | 11/2017 | Prevost |

* cited by examiner

REPLACEABLE CONNECTION MODULES FOR HIGH USE ELECTRONIC DEVICE RECEPTACLES

BACKGROUND

Historically, passengers on aeroplane flights have been supplied with magazines and/or in-flight movies to provide entertainment. However, the increased prevalence of portable electronic devices, such as laptops, tablets, and phones, has made these devices common on flights. Such portable electronic devices may have some power storage; however, as with all devices, this power drains as the electronic devices are used.

BRIEF DESCRIPTION OF THE DRAWINGS

The accompanying drawings illustrate various examples of the principles described herein and are a part of the specification. The illustrated examples do not limit the scope of the claims.

Figure 1:
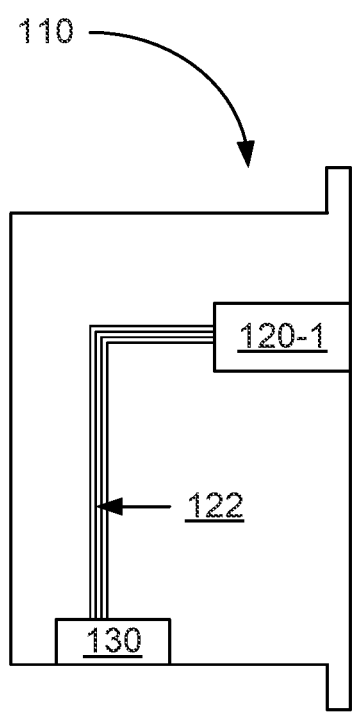
FIG. 1 shows a replaceable connection module in an example consistent with this specification.

Throughout the drawings, identical reference numbers designate similar, but not necessarily identical, elements. The figures are not necessarily to scale, and the size of some parts may be exaggerated or minimized to more clearly illustrate the example shown. The drawings provide examples and/or implementations consistent with the description. However, the description is not limited to the examples and/or implementations shown in the drawings.

DETAILED DESCRIPTION

Increasing use of consumer electronic devices such as laptops, tablets, and phones on aeroplanes has increased demand for outlets to recharge these devices during air travel. Accordingly, some seats on some aeroplanes have been provided with traditional power outlets. In other cases, for a variety of reasons, aeroplanes have been outfitted with Universal Serial Bus (USB) receptacles. While USB receptacles can provide both power and data transfer, much of the use of USB receptacles on aeroplanes is to provide power without data transfer. As used in this specification and the associated claims, the female end of a USB connection is alternately known as a receptacle and the male end of a USB connection is alternately known as a plug.

In general, USB receptacles receive smaller connectors when compared with traditional power outlets. Further, USB plugs and receptacles are not country specific, like traditional power outlets. While a USB receptacle on a laptop and/or similar device may last the lifetime of the device, receptacles used for power transfer on aeroplanes experience high rates of connection and disconnection. This higher rate of wear results in a need to replace receptacles over the service life of the aeroplane. However, implementing receptacles that are replaceable and/or removable by travelers may be undesirable. Accordingly, it may be desirable for the receptacles to be readily replaced by maintenance personnel while being difficult for passengers to remove and/or tamper with.

Additionally, if a part is expected to experience frequent replacement, it may be useful to reduce the cost of the part and/or increase the service life of the part. Decreased part cost and increased service life can reduce the cost of the component on a per-hour or per-flight basis. Further, it may be useful to reduce the time and cost to replace the part. The approach described in the present specification of using a replaceable connection module connected to a controller, may reduce the cost of supporting high use receptacles, such as those found on aircraft. The approach described herein may also be applied to high use connections found in other areas, for example, waiting areas, coffee shops, libraries, etc.

A standard USB-A receptacle has a minimum rated lifetime of 1,500 connect/disconnect cycles, the USB mini-B receptacle has a minimum rated lifetime of 5,000 cycles, and the newer USB-C receptacle is specified to have a minimum rated lifetime of 10,000 cycles. These values are from Section 5.7.1.3, Durability or Insertion/Extraction Cycles (EIA 364-09) of the USB standard. Assuming a 25% use rate, a flight time of 1.4 hours for an estimated mean 2 hours between successive departures, and an 18 hour workday for a plane, an estimated 2.25 connection cycles are executed per day (or ~800 per year). This produces an estimated minimum lifetime of ~2 years for the USB-A receptacle, ~6 years for the USB mini-B receptacle, and ~12 years for the USB-C receptacles. For a roughly 150 seat plane with one receptacle per seat, then after the initial period, a plane would be expected to replace about one 10,000-cycle USB-C receptacle per month.

Accordingly, the present specification describes an electronic device connection that addresses these and other issues. Specifically, the present specification describes a replaceable connection module. The replaceable connection module includes a port to receive signals and/or power from a controller. At least one receptacle of the module provides received signals and/or power to a connected electronic device. The module includes a plurality of conductors connecting the port with the at least one receptacle. Control of the signals and/or power at the at least one receptacle is performed by the controller.

The present specification also describes a power regulation system. The power regulation system includes a controller and a replaceable connection module. The replaceable connection module includes at least one receptacle to receive a Universal Serial Bus (USB) plug, a port, and a number of conductors connecting the port to the at least one receptacle. The controller receives power requests made at the at least one receptacle and allocates power to the at least one receptacle.

The present specification also describes a method of replacing an electronic device receptacle on an aeroplane. The method includes: removing a first replaceable connection module from a location wherein the first replaceable connection module comprises the receptacle and a port; unplugging a single controller plug from the port on the first replaceable connection module; plugging the single controller plug into a port on a second replaceable connection module; and placing the second replaceable connection module into a location previously occupied by the first replaceable connection module.

Among other examples, this specification also describes a power regulation system including: a plurality of receptacles, each receptacle to support a removable module, wherein the module comprises a receptacle to receive a Universal Serial Bus (USB) plug; and a controller to receive power requests from the plugs in the plurality of receptacles and allocate power to the plugs through the receptacles.

FIG. 1 shows a replaceable connection module (110) according to an example consistent with this specification. In this example, the replaceable connection module (110) uses a port (130) to receive signals from the controller via a harness that connects the module (110) to the controller. The port (130) may be any suitable port (130) which provides the desired number of connections to support the receptacle(s) (120) on the replaceable connection module (110). In an example, it is useful to couple multiple ports on the controller to a single port (130) on the module (110) to reduce the cost of the replaceable connection module (110). A plurality of conductors (122) is shown connecting the port (130 and the receptacle(s) (120).

The replaceable connection module (110) also includes a receptacle (120) to receive a connected device. The receptacle (120) may accept a Universal Serial Bus-Type C (USB-C) plug. In some examples, as provided below, the replaceable connection module (110) may accept multiple USB plugs and/or plugs of multiple types.

The receptacle (120) includes electrical contacts that are each connected to an associated conductor which connects the electrical contact to an associated pin on the port (130). Some of the contacts in the receptacle (120) may not be used. In some examples, the plurality of conductors may be limited to three conductors per receptacle (120) plus an additional conductor for a shared ground, wherein the three conductors per receptacle (120) provide: a power line and two communications lines. In another example, the plurality of conductors may include just four conductors per receptacle (120), where the four conductors per receptacle provide: a power line, a ground line, and two communications lines. Limiting the number of conductors between the replaceable connection module (110) and the controller may keep the cost of the replaceable connection module (110) low. In some examples, additional conductors may be added, up to providing full support for all pins of the receptacle(s) (120) on the module (110).

Figure 2:
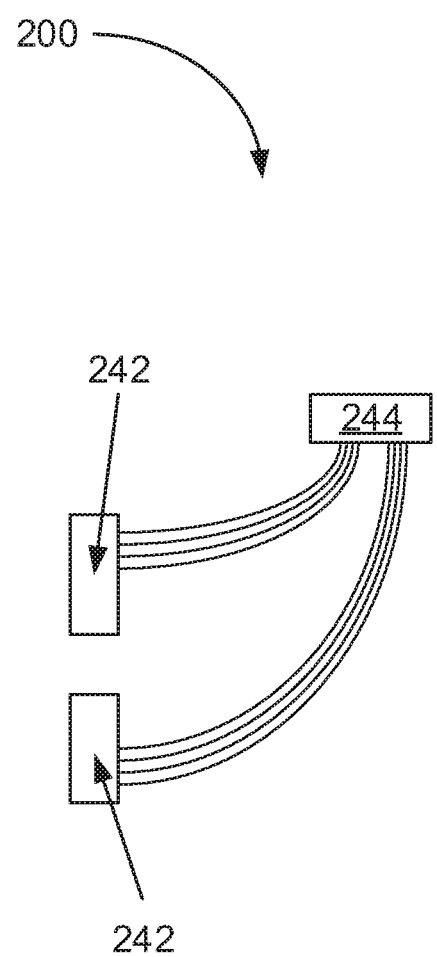
FIG. 2 shows a harness to connect a replaceable connection module to a controller in an example consistent with this specification.

FIG. 2 shows a harness (200) to connect a replaceable connection module (FIG. 1, 110) to a controller in an example consistent with this specification. The harness (200) includes input plugs (242) and an output plug (244). The plugs (242, 244) on the harness (200) connect the controller to the module (FIG. 1, 110).

In an example, the harness (200) includes more input plugs (242) than output plugs (244), with multiple input plugs (242) coupled to a respective output plug (244). Consolidating input plugs (242) into output plug(s) (244) reduces the cost of the replaceable connection module (FIG. 1, 110). For example, the use of one output plug (244) in place of two output plugs reduces the number ports (FIG. 1, 130) needed on the module (110). Coupling multiple input plugs (242) to a fewer output plugs (244) also reduces the cost of the harness (200) because it reduces the number of plug parts used as compared to providing full connection between each pin of ports on the controller and a port (FIG. 1, 130) on the module (FIG. 1, 110).

The harness (200) may use different shapes, colors, and/or designs between the input plugs (242) the output plug(s) (244) which connect to the module (FIG. 1, 110) and controller. Distinguishing the input plugs (242) from the output plugs (244) may prevent the accidental attachment of the harness (200) backward between a controller and a module (FIG. 1, 110). In another example, the input plugs (242) and output plugs (244) may be the same. Doing so reduces the number of parts that need to be maintained in inventory for manufacturing. This may reduce the inventory carrying cost to produce the harness (200).

In an example, the harness (200) receives four wires from each input plug (242) connected to a port on the controller. These four wires may be: a power line, a ground line, and two communication lines. In an example, a shared ground line is provided to the replaceable connection module (FIG. 1, 110) and each connected port on the controller is connected to a power line and two communication lines of the harness (200).

In some examples, the harness (200) has four input plugs (242), four conductors, and four outputs (244) and is a legacy harness (200). This lacks the reduction in plugs as shown in FIG. 2; however, it allows replacement of legacy systems by removing the controller, and/or replaceable connection module (110) without replacing the harness (200) as an upgrade path. This may reduce the time and/or cost of upgrading the system. Further, use of the existing harness (200) may save costs compared to providing a new harness (200).

In one example, the legacy harness (200) with four conductors provides +5V, load shed (LS), and two grounds (GND). These conductors may be repurposed to support a bus voltage (VBUS), load shed (LS), ground (GND), and voltage adjust (VADJ). The VBUS may be maintained at 5 V in the absence of a voltage adjust signal so as to avoid damaging a connected device by reducing the likelihood of providing an overvoltage to a device connected to the receptacle (FIG. 1, 120). For example, when a load at the receptacle (FIG. 1, 120) is removed, the system may automatically set the VBUS voltage to 5 volts. In the event a legacy plug is attached at the receptacle (FIG. 1, 120), the outlet will function as intended, providing the desired 5 volts. However, if a USB-C plug is attached, the USB-C plug can apply a voltage request to the VADJ line and the VBUS voltage may be modified. This approach provides for the reuse of the existing harness (200) while providing compatibility for both legacy and USB-C connections.

The voltage may be measured at the receptacle (FIG. 1, 120). In an example, the voltage provided on the VBUS line is measured at the receptacle (120). This may compensate for line losses by determining the voltage at the plug rather than prior to the line, i.e., at the controller. In an example, voltage measurement and feedback to the controller is provided by a secondary controller associated with the replaceable connection module (110).

Figure 3:
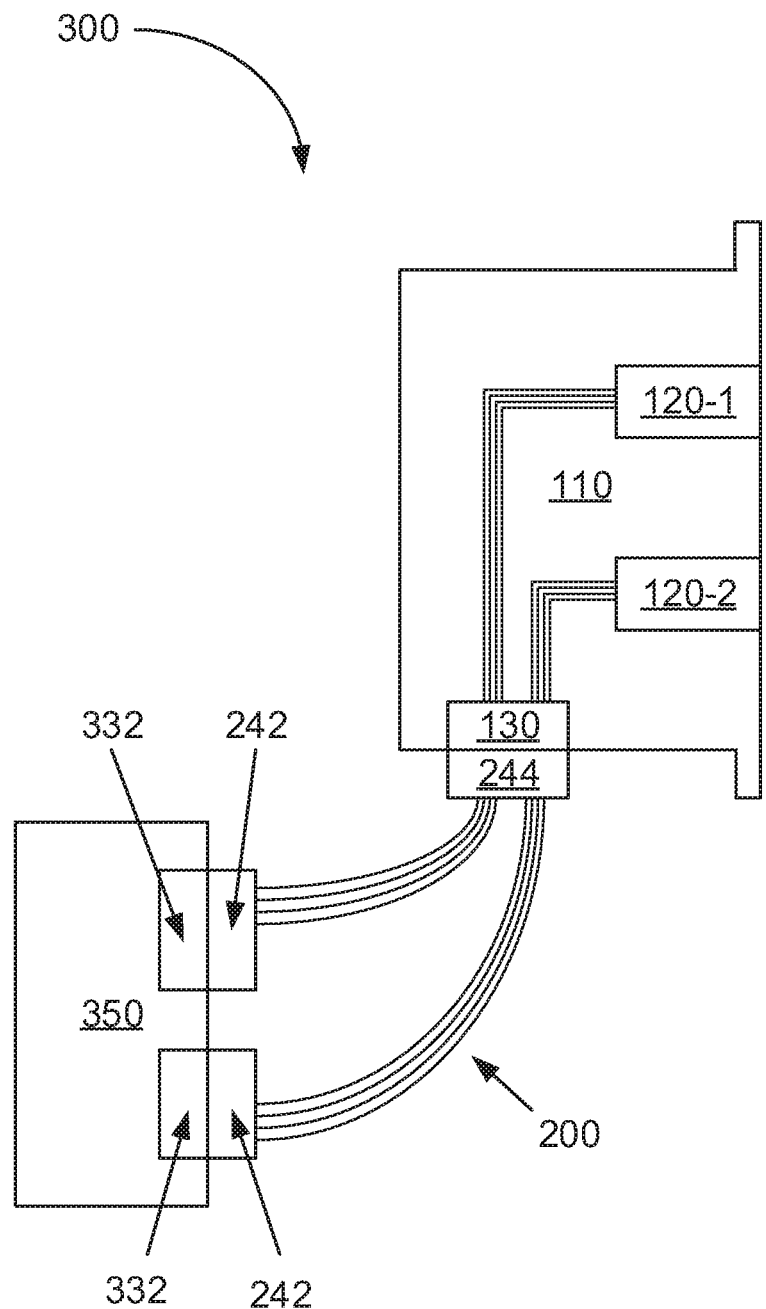
FIG. 3 shows a system with a replaceable connection module connected to a controller in an example consistent with this specification.

FIG. 3 shows a system (300) with a replaceable connection module (110) in an example consistent with this specification. The system (300) is a power regulation system (300) which includes 1) a controller (350) with a plurality of ports (332); 2) a harness (200) with a plurality of input plugs (242) to connect to the controller (350) and a number of output plugs (244) to connect with a replaceable connection module (110). In this example, the number of output plugs (244) is fewer than the plurality of input plugs (242). The system (300) also includes 3) the replaceable connection module (110). As described above, the replaceable connection module (110) has a port (130) to connect to the harness (200) and receptacle(s) (120) in electrical contact with a plurality of pins of the port (130). The controller (350) controls the signals provided at the receptacle (120).

The system (300) allows for the changeout of high use receptacles (120). Specifically, the replaceable connection module (110), which includes the receptacle (120), may be readily replaced by an authorized user such as maintenance personnel while being irreplaceable by a passenger. Such a system (300) reduces the cost of providing the desired functionality and flexibility in power and/or data services. The system (300) employs a number of features in the replaceable connection module (110) to minimize the production cost of the replaceable connection module (110). The harness (200) also provides features which minimize the cost of the system (300) while retaining flexibility in providing power and/or data at the receptacles (120).

The controller (350) may have a long operating life as compared to the receptacles (120). Accordingly, when the receptacles (120) wear out, the replaceable connection module (110) may be replaced by disconnecting the replaceable connection module (110) from the harness (200) and attaching a new replaceable connection module (110) to the output plug (244) on the harness (200). In the event that the output plug (244) wears out, the harness (200) can be replaced without replacing the controller (350). This modularity allows replacement of non-functional components without having to replace the entire system (300).

In one example, only a subset of pins of the output ports (332) are connected to wires in the harness (200). This allows a reduction in the number of input ports (130) on the module (110) compared to the number of ports (332) on the controller (350).

While FIG. 3 depicts two ports (332) on the controller (350) being coupled by the harness (200) to a single port (130) on the replaceable connection module (110), other combinations are possible. For example, the harness (200) may consolidate the outputs of three ports (332) on the controller (350) to a single port (130) on the replaceable connection module (110). In another example, the harness (200) may consolidate three ports (332) on the controller (350) to two ports (130) on the replaceable connection module (110). This consolidation allows multiple receptacles (120) on the replaceable connection module (110) to be supported by a smaller number of ports (130) including a single port (130) on the module (110). This in turn may reduce the cost and complexity of the replaceable connection module (110).

In an example, the output port(s) (332) may be USB ports. In such a situation, the harness (200) and replaceable connection module (110) may be effectively undetected by the controller (350) and/or to a device attached to a receptacle (120) on the replaceable connection module (110). That is, the harness (200) and replaceable connection module (110) may be electrically transparent to the controller (350) and/or the attached device(s).

As described above, the harness (200) has input plugs (242) which receive input from the controller (350) and output plug(s) (244) which provide output to the module (110). Signals may be provided in both directions. Current flows in a loop on the power and ground lines to provide power to a device attached to the receptacle (120).

The use of the harness (200) and replaceable connection module(s) (110) allow the system (300) to be readily upgraded without replacing the controller (350). For example, if it is desired to add data transfer functionality to the receptacles (120), the harness (200) and/or replaceable connection module (110) without such functionality are disconnected from the controller (350) and replaced with a harness (200) with data lines and/or a replaceable connection module (110) having a receptacle (120) with a different number of active pins. This allows the system (300) to be upgraded with minimal time and cost.

Similarly, the receptacles (120) may be changed between different types and shapes depending on the local usage. This may be helpful for traditional power connections, which may be country specific, when an aeroplane is shifted to a different route. For example, some replaceable connection modules (110) may use USB-C receptacles while other replaceable connection modules (110) may use a different type of receptacles (120). Allowing the changing of modules (110) allows for the accommodation of any type of receptacle with appropriate connection modules (110). As another example, it may be desirable to configure the system (300) with replaceable connection modules (110) having a USB-A receptacle (120) and a USB-C receptacle (120). In general, the connection module (110) may include a variety of receptacles (120), which may or may not be of the same type. The interchangeability of the replaceable connection modules (110) may allow an airline to phase-in a particular type of module (110), for example, by initially placing them on every other seat. Similarly, placing different configurations of replaceable connection modules (110) in adjacent seats may be used to provide a wider variety of receptacles (120) for travelers. Moreover, if another receptacle comes into widespread use, a replaceable connection module (110) to provide the new type of receptacle (120) can be implemented at relatively low cost while preserving backward compatibility with the existing controller (350). In an example, the replaceable connection module (110) and/or the harness (200) includes a microcontroller to provide the backwards compatibility and to avoid needing to replace the controller (350) in order to provide the desired upgrade. In other examples, the replaceable connection module (110) and/or harness (200) includes a Field Programmable Gate Array (FPGA), Complex Programmable Logic Device (CPLD), Application Specific Integrated Circuit (ASIC), and/or other logic to provide the backward compatibility with or without replacement of the controller (350).

In the case of a USB-C connector, a receptacle (120) may be compatible with either insertion orientation of the USB-C plug. In an example, some pins on the receptacle (120) are consolidated in the replaceable connection module (110) prior to connecting to the harness (200). This means that a signal provided on either pin of the receptacle (120) is provided to a shared pin on the port (130). For example, the pairs of contacts on opposite rows of a USB-C connection may be consolidated prior to being provided to the port (130). This may be accomplished by forming an electrical connection between the two pins on the receptacle (120). This consolidation may happen at the receptacle (120) and/or at the port (130). In other examples, the consolidation may occur between the receptacles (120) and the port (130). Consolidation may reduce the number of wires in the harness (200) while still maintaining full functionality of all pins in the receptacle (120). For example, the number of ports (130) on the replaceable connection module (110) can be minimized and the harness (200) can split the signals from the replaceable connection module (110) to multiple ports (332) on the controller (350). Similarly, some pins on a USB-C connection may not be used. In some examples, these pins are not connected in order to reduce the cost of the harness (200) and/or replaceable connection module (110). However, if a future revision adopts usage standards for these extra pins, the replaceable connection module (110) may be upgraded depending on whether the additional usage is relevant to the usage in the system (300). In some examples, providing a minimum number of connections, e.g., a power line, a ground line, and two communications lines keeps the cost of the module (110) low without impact on the user.

Figure 4:
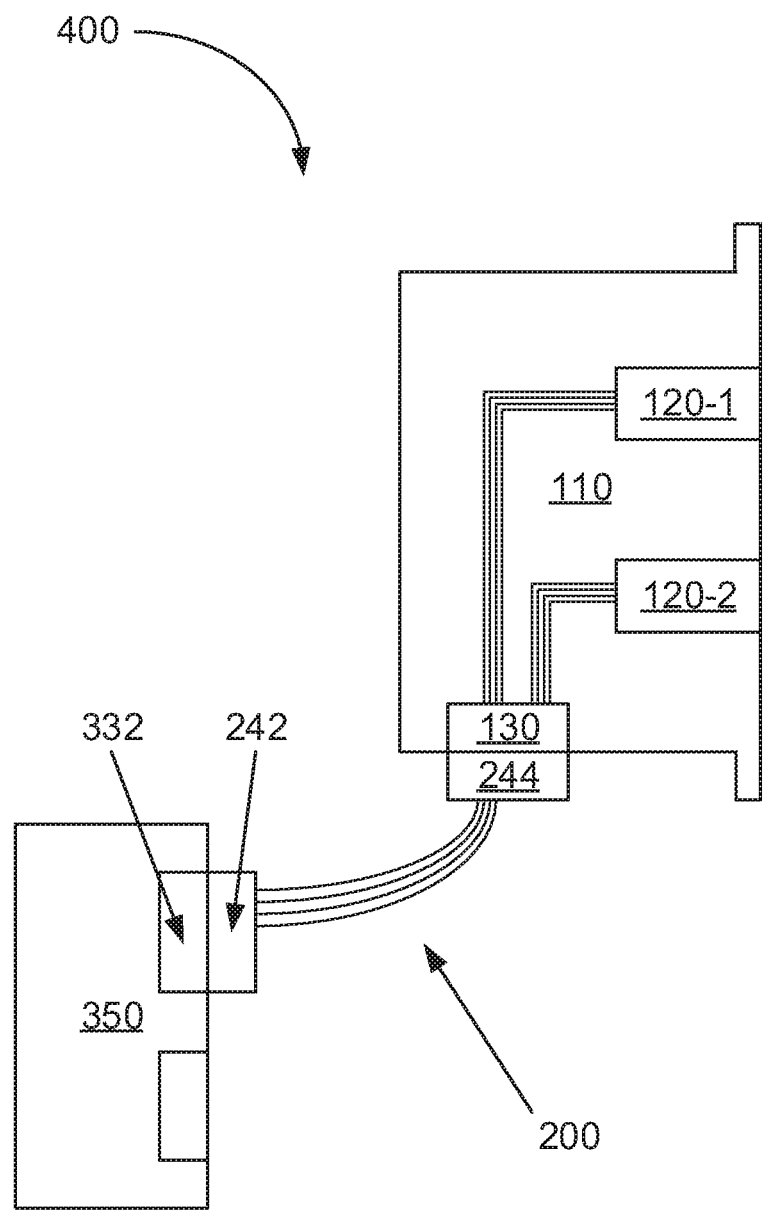
FIG. 4 shows a system with a replaceable connection module connected to a controller in an example consistent with this specification.

FIG. 4 shows a system (400) with a replaceable connection module (110) in an example consistent with this specification. As described above, the system (400) is a power regulation system (400) which includes 1) a controller (350) with a plurality of ports (332); 2) a harness (200) with a number of input plugs (242) to connect to the controller (350) and a number of output plugs (244) to connect with 3) a replaceable connection module (110). In this example, the input plugs (242) map one to one to the output plugs (244). This approach allows provision of signals to all pins in the receptacle (120). The system (400) also includes the replaceable connection module (110). As described above, the replaceable connection module (110) has a port (130) to connect to the harness (200) and receptacle(s) (120) in electrical contact with a plurality of pins of the port (130). The controller (350) controls the signals provided at the receptacle (120).

Figure 5:
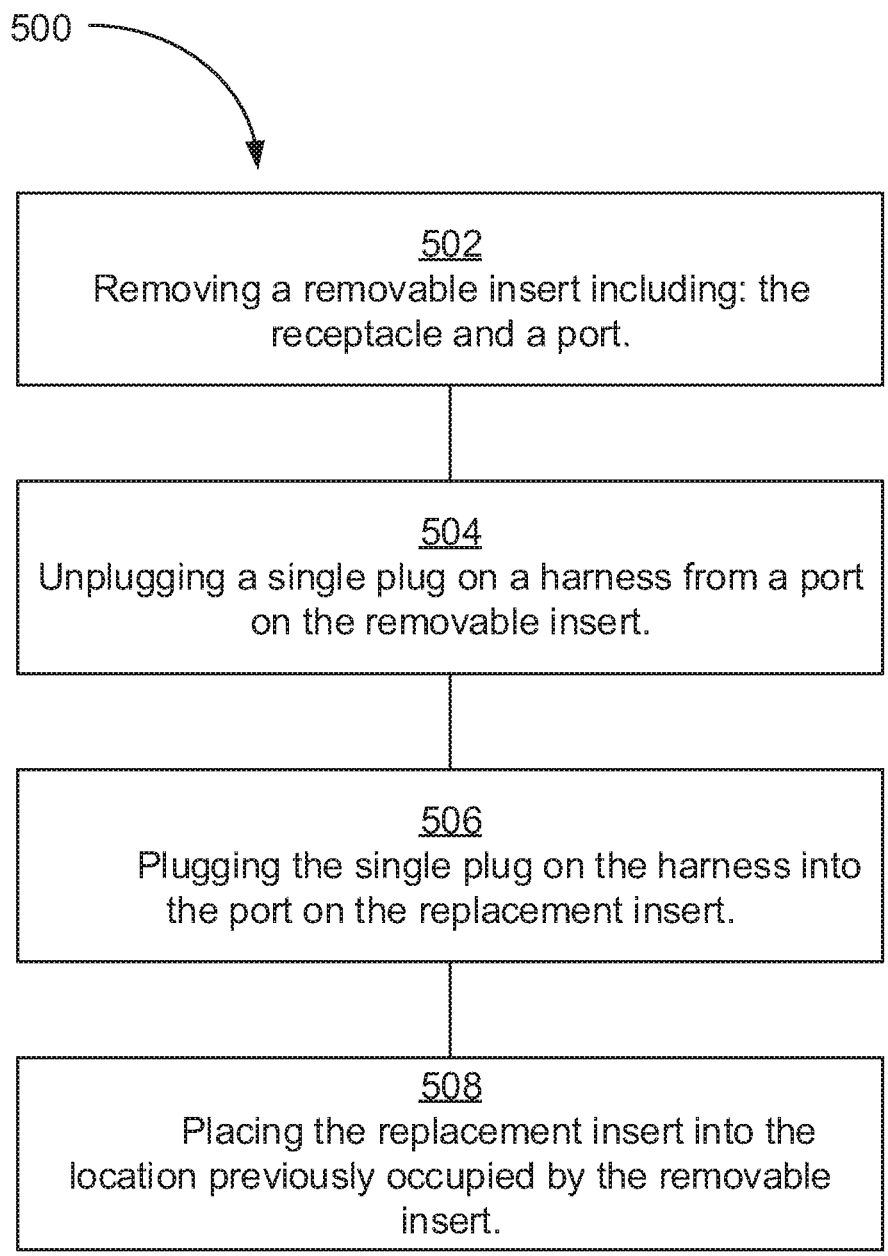
FIG. 5 shows a flowchart of a method of replacing a replaceable connection module consistent with this specification.

FIG. 5 shows a flowchart for a method (500) of replacing a receptacle (120) in a replaceable connection module (110) on an aeroplane. The method (500) facilitates rapid and effective replacement of the receptacle (120) with and/or without tools.

The method (500) includes removing (block 502) a removable module (110) that includes the receptacle (120) and a port (130). In an example, the removable connection module (110) is located in a seatback. In another example, the removable connection module (110) may be located in an armrest. In yet another example, the removable connection module (110) may be located in a console between two seats. In some examples, the removable connection module (110) may be removed by hand. In another example the module (110) may use a tool and/or key to remove. Requiring a tool/key to remove the module (110) may limit tampering by passengers.

The method (500) includes unplugging (block 504) a single output plug (244) on a harness (200) from the port (130) on the removable connection module (110). As discussed above, the use of a single plug to support multiple receptacles for power and/or data provides cost savings for the replaceable connection module (110). The use of a single plug (244) may also decrease replacement time. In configurations where the harness (200) is integrated with the removable connection module (110), this step may not be required. Instead, the combination harness (200) and removable connection module (110) may be disconnected from the controller (350). A replacement harness (200) and removable connection module (110) may then be attached to the controller (350).

The method (500) includes plugging (block 506) the single plug (244) on the replacement harness (200) into a port (130) on a replacement module (110). The use of a single plug (244) may avoid putting plugs (244) into incorrect ports (130). In an example, the plug (244) enters the port (130) in a single orientation. In another example, the plug (244) may connect to the port (130) in two orientations, for example 180 degrees rotated from each other. The pin selection may be arranged so that the receptacles (120) map to different ports (332) on the controller (350) but still function regardless of the orientation elected. Accordingly, the connections on the port (130) may be organized with a rotational symmetry to provide this option. This maybe similar to the orientation independence of a USB-C plug/receptacle but providing different signals from each row of pins.

The method (500) includes placing (block 508) the replacement module (110) into a location previously occupied by the removable module (110). In some examples, a latch and/or other securement may be activated to retain the replacement module (110) in the location. In this example, the method (500) may further include unlatching the removable module (110) from the location as part of the replacement process. The unlatching may be performed manually and/or with a tool and/or key. In an example, the unlatching is performed using a key and/or tool located on, provided with, or integrated into the replacement module (110). Having the key or tool associated with the replacement module (110) ensures that it is on hand when replacing the replacement module (110).

In an example, a receptacle (120) on the new replaceable connection module (110) is a different kind of receptacle (120) from the receptacle (120) on the removed old replaceable connection module (110). This allows a user to change out the replaceable connection module (110) to provide different receptacles (120). For example, different portions of a plane may be outfitted with different numbers and kinds of receptacles (120) to meet the needs of passengers. Different receptacles (120) may also be selected to prevent excess demands for power on the aeroplane's systems. For example, USB-C receptacles (120) may be used to provide more power than USB-A and/or other early generation receptacles (120). The replaceable connection module (110) may include multiple types of receptacles (120). In an example, the replaceable connection module (110) includes a plurality of USB-C receptacles (120). In another example, the replaceable connection module (110) may include multiple receptacles (120) of multiple kinds of receptacles (120). In an example, the only electrical connections of the replaceable connection module (110) are in the port (130) to receive the single plug (244) and in the receptacles (120).

Figure 6:
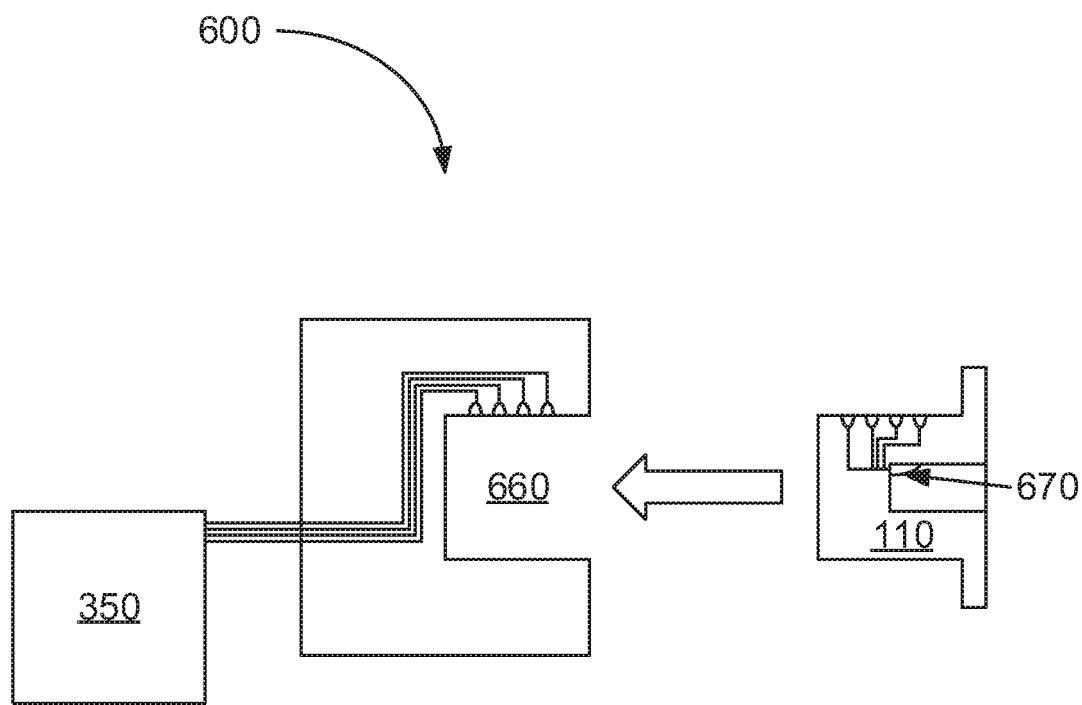
FIG. 6 shows a system with a replaceable connection module according to an example consistent with this specification.

FIG. 6 shows a system (600) with a replaceable connection module (110) according to an example consistent with this specification. The system (600) includes a controller (350) in electrical communication with a receptacle (120). The interface (660) receives the replaceable connection module (110). The replaceable connection module (110) includes a receptacle (120) for connecting with a Universal Serial Bus (USB) connector of a connected device. Electrical connections extend from the controller (350) through the interface (660) to the receptacle (120) such that the controller (350) controls the output of power to a coupled USB connector.

The system (600) as described herein allows for the replacement of the replaceable connection module (110) and keeps the cost of the replaceable connection module (110) low by minimizing the components in the replaceable connection module (110). This setup allows the connection between the controller (350) and the receptacle (120) to avoid wear.

In some examples, the controller (350) may be part of a larger system. For example, the controller (350) may interact with multiple receptacles (120) and the associated replaceable connection modules (110). In general, the controller (350) controls the operation of the receptacle (120). Controlling the receptacle (120) remotely from the controller (350) reduces the cost of the replaceable connection module (110) as the replaceable connection module (110) need not include control hardware. In an example, the replaceable connection module (110) contains no logics and/or other associated control elements, with all such logic and/or associated control elements being located in the controller (350). In another example, the logics and/or control elements are located in the harness (200).

In some examples, the replaceable connection module (110) may include a backlight, an overvoltage indicator, an overcurrent indictor, and/or other indicators. In some examples, the replaceable connection module (110) includes no additional electronic elements besides a connection with the controller (350), the receptacles (120) to support user devices, and electrical connections between the connection and the receptacles (120).

The interface (660) receives the replaceable connection module (110). The interface (660) includes multiple electrical contacts to provide signals and power to the receptacle (120) in the replaceable connection module (110). The signals and power may all be routed directly from the controller (350) and power may be provided by a power supply which is regulated by the controller (350).

The interface (660) includes electrical connections to mate with corresponding electrical connections on the replaceable connection module (110). The interface (660) may include electrical connections designed for different replaceable connection modules (110). For example, the interface (660) may contain a first set of electrical connections for a first replaceable connection module (110) where the first module (110) includes a first type of receptacle (120) to receive a first type of USB plug. The interface (660) may contain a second set of electrical connection for a second replaceable connection module (110), where the second replaceable connection module (110) includes a second type of receptacle (120) to receive a second type of plug. The sets of electrical contacts may be independent of each other. In other words, some and/or all of the electrical contacts may be used to support multiple types of replaceable connection modules (110). In an example, some of the contacts are connected together by the module (110), for example to provide redundancy and/or reduce total contact resistance.

The interface (660) includes electrical connections to connect with the receptacle (120) through the module (110). The receptacle (120) accommodates a plug. Upon insertion, the plug makes contacts with the electrical contacts of the receptacle (120).

The use of a replaceable connection module (110) makes changeout of the receptacles (120) on device (600) relatively cost effective and quick. For example, if a new type of receptacle (120) becomes common, a new replaceable connection module (110) which includes the new type of receptacle (120) may be phased in and the existing modules (110) with an older receptacle (120) can be changed out without replacing the controller (350) and/or the whole system (600). Similarly, if the power supply for the aircraft is upgraded, receptacles (120) which may be expected to provide more power, e.g., USB-C vs. USB-A, may be installed. This flexibility extends the lifetime of the system (600) while also allowing an airline to provide the current types of receptacles (120) for passengers.

Returning to the replaceable connection module (110), as described above the receptacle (120) on the replaceable connection module (110) makes electrical contact with the plug to provide power and/or information to a device attached to the plug. In an example, the replaceable connection module (110) has four contacts for providing power and does not have any contacts associated with information transfer. Providing just the handshake communication and power lines may reduce the number of parts in the replaceable connection module (110). This may reduce the production cost and/or may increase the lifetime of the replaceable connection module (110).

In some examples, the plug may be a USB plug, which is used on a variety of electronic devices. There are a variety of types of USB connections with a variety of shapes.

In general, USB-C ports include 24 electrical connection organized in two rows of twelve. The electrical connections allow rotational redundancy to the connection. In some examples, not all the electrical connections are provided by the receptacle (120) in the replaceable connection module (110). For example, it may be desirable to only support the power, ground, and two communication connections. This reduces the number of components in the replaceable connection module (110), reducing the cost of the replaceable connection module (110).

Figure 7:
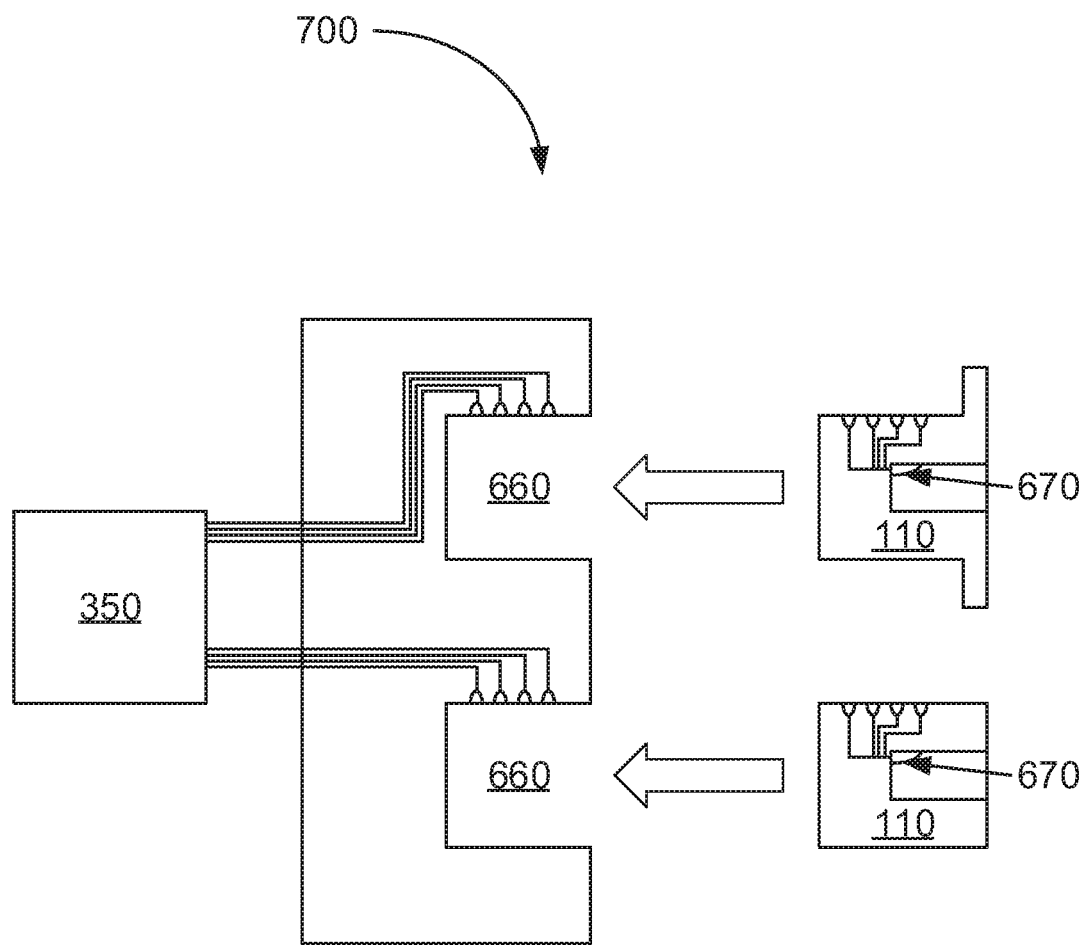
FIG. 7 shows a system with multiple replaceable connection modules according to an example consistent with this specification.

FIG. 7 shows a system (700) with multiple replaceable connection modules (110) according to an example consistent with this specification. In this example, the system (700) includes the controller (350) in electrical communication with two interfaces (660), each interface (660) to receive a removable module (110). As described above, modules (110) include contacts (670) for connecting with a Universal Serial Bus (USB) plug. Electrical connections extend from the controller (350) through the receptacle (120) to the contacts (670) such that the controller (350) controls the output of power to the USB connector.

While FIG. 7 depicts two interfaces (660), the device (700) may contain additional interfaces (660). In some examples, interfaces (660) may support individual replaceable connection modules (110) where each replaceable connection module (110) has a single receptacle (120). In other examples, a replaceable connection module (110) may have multiple receptacles (120). For example, the replaceable connection module (110) may include a faceplate which covers the exposed portion of the device (700) to minimize tampering. The faceplate may extend laterally from the replaceable connection module to cover an area of a seatback. The replaceable connection modules (110) may be different from each other. That is, different replaceable connection modules (110) may have different receptacles (120) to receive different types of plugs. For example, a first replaceable connection module (110) with a first receptacle (120) may accept a USB-A plug and a second replaceable connection module (110) with a second receptacle (120) may accept a second type of plug.

Figure 8:
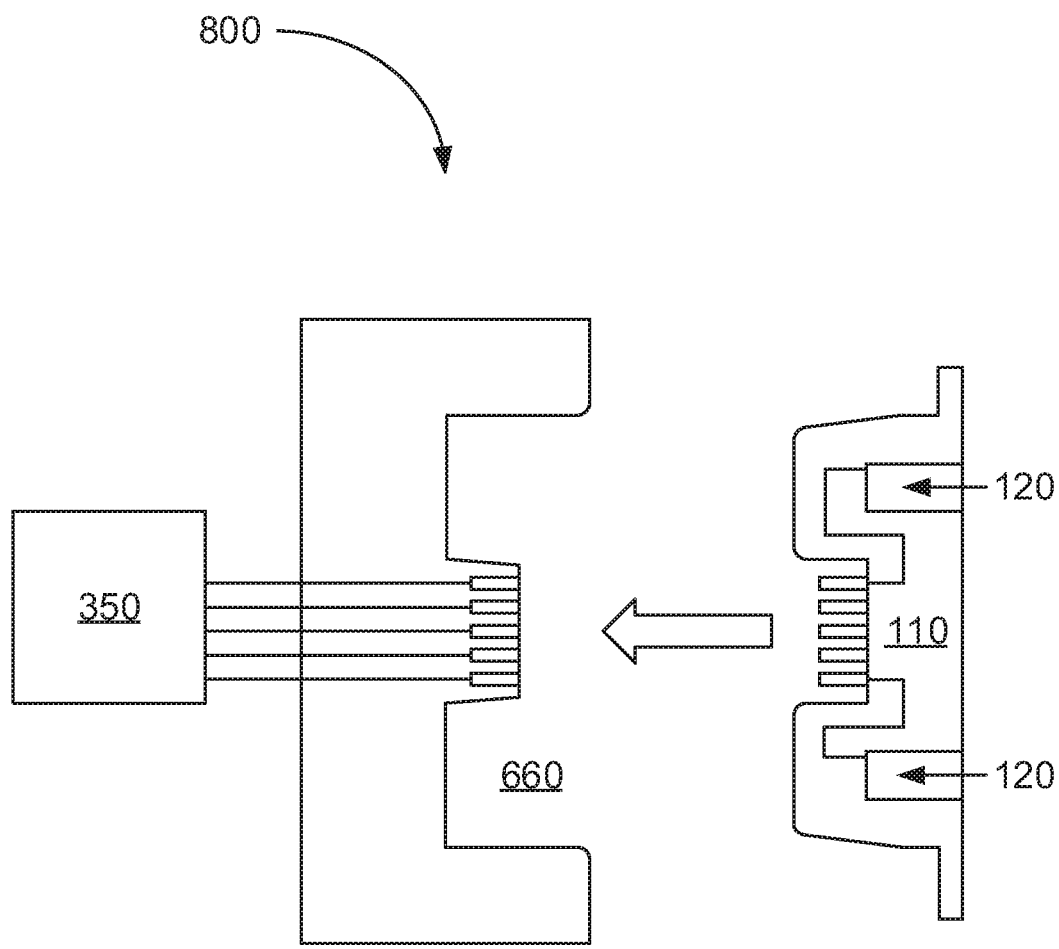
FIG. 8 shows a system with a replaceable connection module according to an example consistent with this specification.

FIG. 8 shows a system (800) with a replaceable connection module (110) according to an example consistent with this specification. The system (800) includes a controller (350) in electrical communication with a receptacles (120), the interface (660) containing a replaceable connection module (110), wherein the replaceable connection module (110) includes two receptacles (120) to receive plugs from Universal Serial Bus (USB) connectors and wherein electrical connections extend from the controller (350) through the receptacle (120) to the contacts (670) such that the controller (350) controls the output of power to an attached USB plug.

In some examples, the replaceable connection module (110) may include a faceplate to cover the area around the receptacle. Including a faceplate on the module (110) also allows modification of the aesthetic elements associated with the receptacle(s). The faceplate may be provided with a logo and/or other branding, coloration, labeling, and/or other elements to allow customization to reflect the design of the cabin. The faceplate may indicate the type of connections accepted in the receptacle(s) (120).

Figure 9:
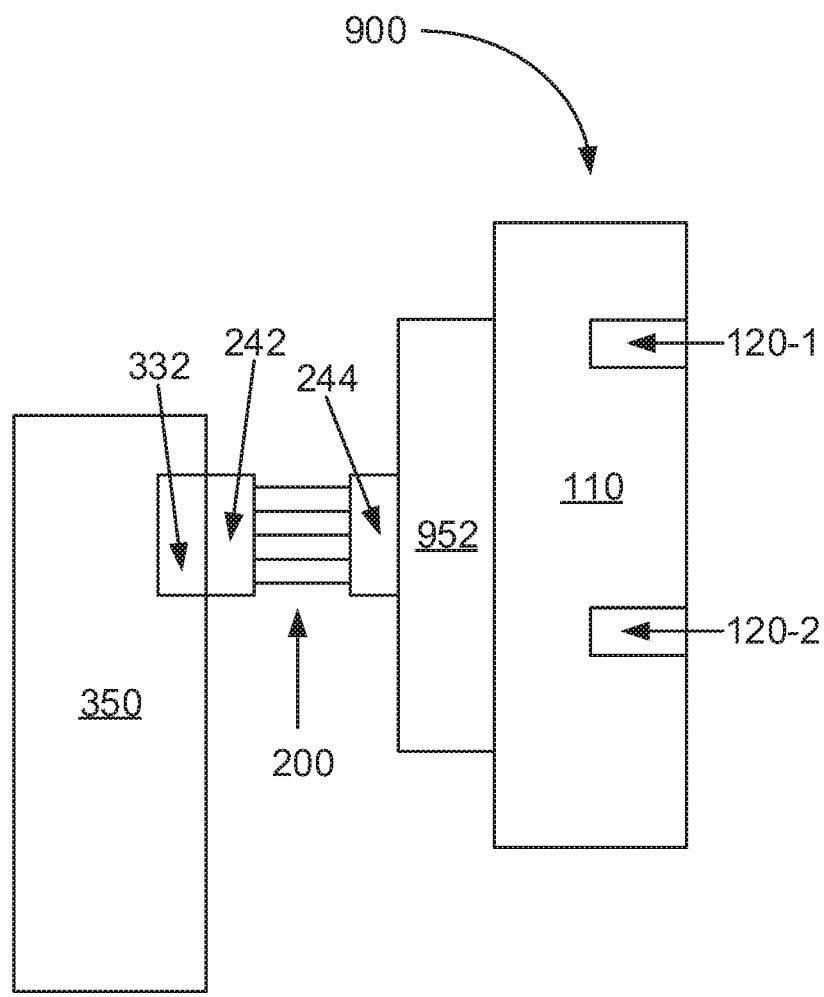
FIG. 9 shows a system with a replaceable connection module according to an example consistent with this specification.

FIG. 9 shows a system (900) with a replaceable connection module (110) according to an example consistent with this specification. The system (900) includes a primary controller (350) and a secondary controller (952) connected by a harness (200). The harness (200) connects the two controllers (350, 952) via plugs (242, 244) coupled to ports (332) on the primary controller (350) and secondary controller (952). The secondary controller (952) is attached, either directly or indirectly, to the replaceable connection module (110). The replaceable connection module (110) includes receptacles (120) which include contacts in electrical connection with the second controller (952).

As described above, the example depicted in FIG. 9 provides the secondary controller (952) associated with the replaceable connection module (110). The secondary controller (952) and the replaceable connection module (110) may be integrated into a single device. Integrating the secondary controller (952) and connection module (110) avoids the need for the port/plug which reduces costs. In some examples, the secondary controller (952) and the replaceable connection module (110) are separate components and are electrically connected by a port/plug combination or other type connection structure. Using a plug/port structure with separate second controller (952) and replaceable connection module (110) allows the replaceable connection module (110) to be replaced without replacing the secondary controller (952) or primary controller (350).

The secondary controller (952) may be used to allow additional capabilities to the primary controller (350). For example, the secondary controller (952) may provide profiles and/or communication channels not available from the primary controller (350).

For example, the secondary controller (952) may modify the signals provided to the receptacle (120). One use of this may be to provide backward compatibility with an existing controller (350) and/or harness (200). In another example, the secondary controller (952) modifies the voltage provided on a voltage line, e.g., VBUS. For example, the primary controller (350) may provide a high voltage line to the secondary controller (952). The secondary controller (952) then reduces the voltage before providing it to the receptacle(s) (120). The ability to tune the output voltage at the secondary controller (952) may provide additional flexibility in future system upgrades.

As described above in relation to FIG. 2, a four-pin receptacle (FIG. 1, 120) may provide legacy seatbox functionality by using a voltage (VBUS), a ground (GND), an voltage adjust signal (VADJ), and a signal line (LS). The adjustable voltage may be maintained at 5 volts or another preset voltage when not under load. Doing so avoids accidentally connecting a high voltage to a new plug making contact. In an example, the +5 volts is selected based for the receptacle, e.g., USB. Once a load is attached, i.e., a device connected, a signal may be provided to the receptacle (FIG. 1, 120) on the VADJ line to instruct the primary controller (350) and/or the secondary controller (952) to increase the voltage. This increased voltage may be provided on the VBUS. The secondary controller (952) commands the VADJ line for voltage adjustment signals and may monitor VBUS.

In an example, the secondary controller (952) is separable from the replaceable connection module (110). As discussed above, in this example, a plug/socket or similar connection mechanism may be used to connect the secondary controller (952) and the replaceable connection module (110). The replaceable connection module (110) may contain no logics. That is, the replaceable connection module (110) may passively transmit a signal without altering it. For example, the replaceable connection module (110) may contain an electrical connection to receive the signals, conductors to provide the signals to the receptacles (120), and the electrical contacts in the receptacles (120) as the only electrical components. Such a "passive" replaceable connection module (110) provides the ability to economically and quickly replace the receptacles (120) in high use environments, such as aeroplane seating. As discussed above, the secondary controller (952) may be integrated with the replaceable connection module (110). This may allow greater backwards compatibility.

Figure 10:
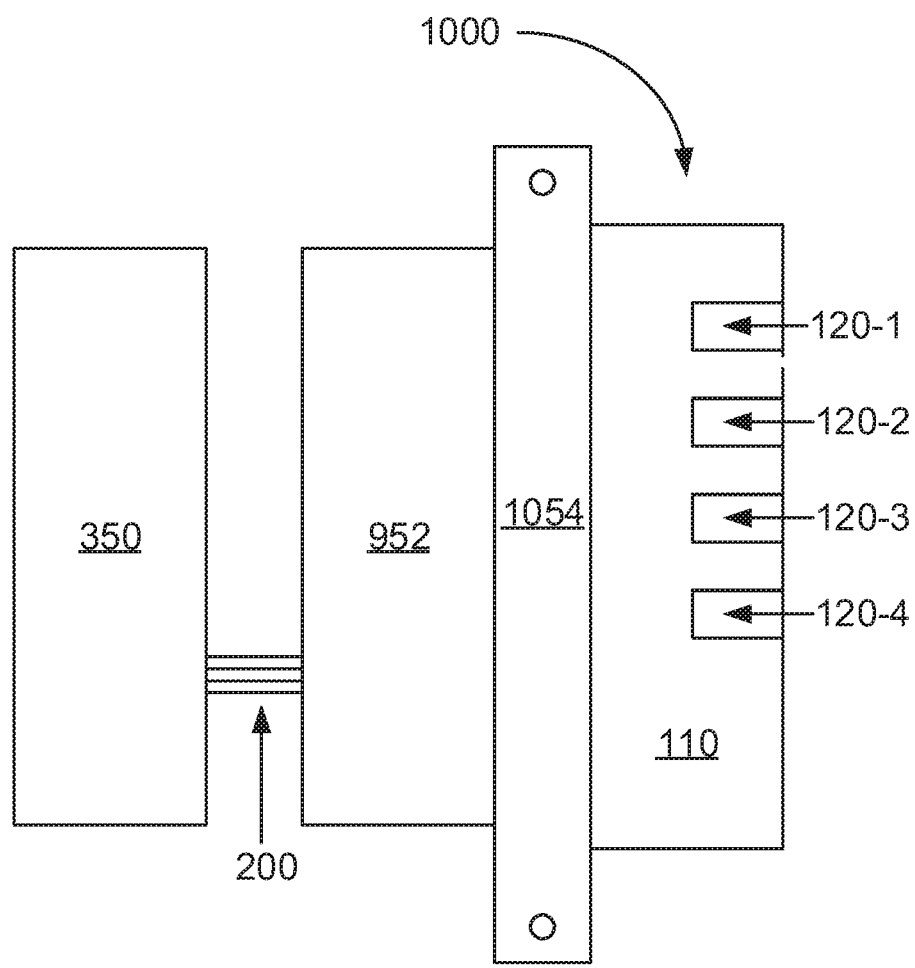
FIG. 10 shows a system with a replaceable connection module according to an example consistent with this specification.

FIG. 10 shows a system (1000) with a replaceable connection module (110) according to an example consistent with this specification. The system (1000) includes a controller (350) connected by a harness (200) to a secondary controller (952). The secondary controller (952) is electrically connected to a seatback mounting location (1054) which also receives the replaceable connection module (110) containing the receptacle(s) (120). That is, the example depicted in FIG. 10 is a dual sided outlet that stabilizes the connection between the secondary controller (952) and the replaceable connection module (110).

The seatback mounting location (1054) may include a frame and electrical connections which are stabilized in the mounting location, which may be in a seatback. That is, the seatback mounting location (1054) provides mechanical stabilization and facilitates attaching (e.g., plugging in) the replaceable connection module (110) and/or the secondary controller (952).

It will be appreciated that, within the principles described by this specification, a vast number of variations exist. It should also be appreciated that the examples described are only examples, and are not intended to limit the scope, applicability, or construction of the claims in any way.

What is claimed is:

1. A replaceable connection module comprising, within a single unitary structure:
   a port to receive a connection to a controller, the connection to provide signals and power from the controller;
   at least one receptacle to receive a plug from a connected electronic device and provide received signals and power to the connected electronic device; and
   a plurality of conductors connecting the port with the at least one receptacle,
   wherein control of the signals and power supplied to the at least one receptacle is performed by the controller via the port;
   wherein the replaceable module is structured to, as a single unit, replace a prior connection module upon connection of the port with the controller.

2. The replaceable connection module of claim 1, wherein the single unity structure excludes audio or video output components.

3. The replaceable connection module of claim 1, wherein the at least one receptacle comprises a plurality of receptacles.

4. The replaceable connection module of claim 3, wherein the plurality of receptacles comprise different types of receptacles.

5. The replaceable connection module of claim 3, wherein:
the plurality of conductors comprise no more than four conductors per receptacle; and
the plurality of conductors provides to each receptacle: a power line, a ground line, and two communication lines.

6. The replaceable connection module of claim 1, wherein:
the plurality of conductors comprises a shared ground line for each of the plurality of receptacles;
three conductors are coupled to each receptacle; and
the three conductors per receptacle provide: a power line and two communications lines.

7. The replaceable connection module of claim 1, wherein:
the plurality of conductors comprises four conductors per receptacle in the module; and
the four conductors per receptacle comprise: a power line, a ground line, and two communications lines.

8. A power regulation system comprising:
a replaceable connection module comprising, within a single unit structure:
one or more receptacles to receive a Universal Serial Bus (USB) plug;
a port to receive a connection to a controller, the connection to provide signals and power from the controller; and
a number of conductors connecting the port to the one or more receptacles; and
a replaceable harness comprising an output plug to plug into the port and an input plug to plug into a port of the controller, with a number of electrical lines running between the input plug and the output plug.

9. The power regulation system of claim 8, wherein a receptacle of the one or more receptacles is a Universal Serial Bus-Type C (USB-C) receptacle.

10. The power regulation system of claim 8, wherein the one more receptacles comprise a plurality of receptacles.

11. The power regulation system of claim 8, wherein the number of conductors comprises four conductors per receptacle and wherein the four conductors provide: a power line, a ground line, and two communication lines.

12. The power regulation system of claim 8, wherein the number of conductors comprises three conductors per receptacle plus a shared ground.

13. The system of claim 8, wherein the harness further comprises multiple input plugs to plug into multiple ports of the controller with a number of electrical lines running between each of the multiple input ports and the single output port for connection to the port on the module.

14. The power regulation system of claim 13, wherein the module comprises multiple receptacles, each receptacle corresponding to a different controller port through the electrical lines of the harness.

15. A method of replacing a power outlet in an aircraft, the method comprising:
removing a first replaceable connection module from a location, where the first replaceable connection module comprises a receptacle for outputting power to a connected electronic device and a port for receiving power from a controller, the module being a power outlet without a video display device;
unplugging a single controller plug from the port on the first replaceable connection module;
plugging the single controller plug into a port on a second replaceable connection module; and
placing the second replaceable connection module into the location previously occupied by the first replaceable connection module.

16. The method of claim 15, wherein the location previously occupied by the first replaceable connection module is located in a seat back.

17. The method of claim 15, wherein a receptacle on the second replaceable connection module is of a different type then the receptacle on the first replaceable connection module.

18. The method of claim 15, further comprising unlatching the first replaceable connection module from the location.

19. The method of claim 15, wherein each replaceable connection module includes just electrical connections in the port and the receptacles.

20. The method of claim 15, wherein the replaceable connection modules comprise a plurality of Universal Serial Bus type C (USB-C) receptacles.

* * * * *